F. N. ROEHRICH.
AMMONIA STOP VALVE.
APPLICATION FILED MAR. 16, 1910.
1,045,187.
Patented Nov. 26, 1912.
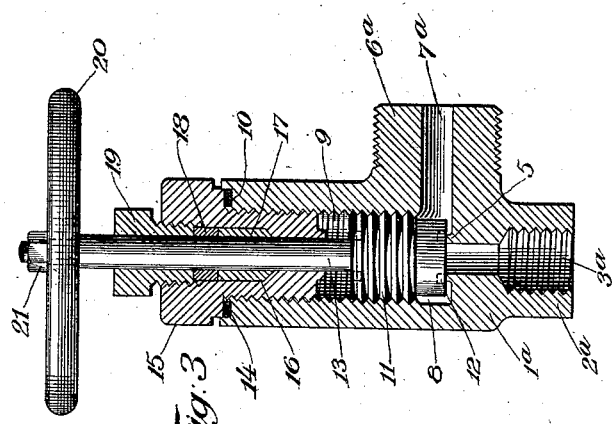
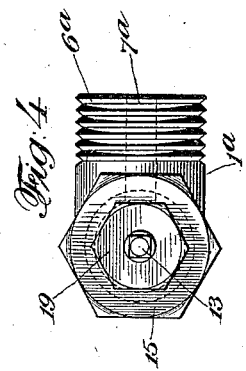
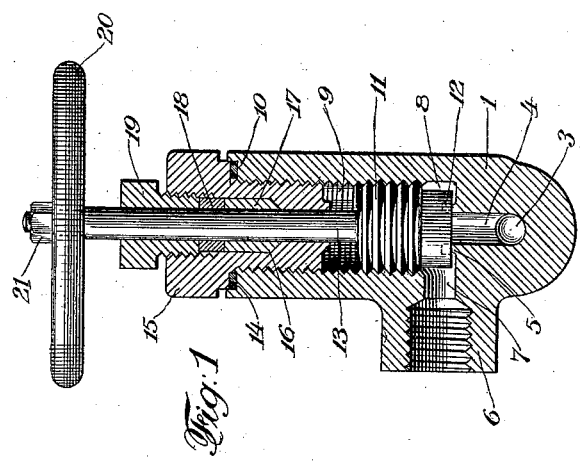
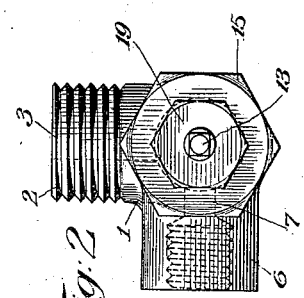
Witnesses:
Jesse H. Swirdler.
John E. Prager
Inventor
Frank N. Roehrich
By his Attorney
George P. Carroll

UNITED STATES PATENT OFFICE.

FRANK N. ROEHRICH, OF JERSEY CITY, NEW JERSEY, ASSIGNOR TO GEORGE P. CARROLL, OF BRIDGEPORT, CONNECTICUT.

AMMONIA-STOP VALVE.

1,045,187. Specification of Letters Patent. Patented Nov. 26, 1912.

Application filed March 16, 1910. Serial No. 549,793.

*To all whom it may concern:*

Be it known that I, FRANK N. ROEHRICH, a citizen of the United States, residing at Jersey City, in the county of Hudson and State of New Jersey, have invented a new and useful Ammonia-Stop Valve, of which the following is a specification.

My invention especially relates to improvements in hand operated stop valves for controlling the flow of ammonia through conduits of small capacity; but it is also useful for so controlling the flow of any high tension fluids, such as carbon dioxid, whether in liquefied or vaporous form. My purpose is to construct a valve so designed that, in its principal parts, it can be made out of drop forged steel, so as to have a non-porous casing, and that will be simple, compact and economical of construction. The means employed are as will appear.

In the drawings Figure 1 is a partial vertical section and a partial elevation of my invention with a left elbow construction. Fig. 2 is a plan view of the same valve with its lock nut and hand wheel removed. Fig. 3 is a partial vertical section and a partial elevation of my invention with a down elbow construction. Fig. 4 is a plan view of the latter valve with its lock nut and hand wheel removed.

First considering Figs. 1 and 2: A casing 1 has at its lower end a lateral cylindrical hub 2 with a horizontal straight passage 3 extending from the outer end of the hub and in axial alinement with it to the vertical center of the main part of the casing. From the inner end of the passage 3 a straight passage 4 extends vertically upward for a short distance and terminates in a rimmed valve seat 5 in axial alinement with the main part of the casing 1. A little above the hub 2 and at right angles with it, the casing 1 has another lateral cylindrical hub 6 with a horizontal straight passage 7 extending from above the seat 5 to the outer end of the hub and in axial alinement with it. Around and above the seat 5 for a vertical distance not less than the diameter of the inner end of the passage 7 is a plain cylindrical valve chamber 8; and above this plain chamber is a threaded chamber 9, in axial alinement with the seat 5 and extending to the top of the casing 1. At the top of the casing 1 around the chamber 9 is an annular gasket recess 10.

The chamber 9 is of uniform diameter, throughout its length, except as altered by being threaded.

The outside of the casing 1 is so shaped that the outside surface of the hub 2 is concentric with the passage 3; that the outside surface of the hub 6 is concentric with the passage 7; and that the outside of the main vertical part of the casing is concentric with the passage 4, the seat 5, the chamber 8, the chamber 9 and the recess 10. And the walls of the casing may be made as thin as the nature of the material and the pressure of the transmitted fluid will permit. Accordingly the casing 1 may drop forged in any one of several ways.

First: The dies may be so constructed that, laying the hot piece of steel to be forged on what will eventually be its side, one series of dies will fashion what is now, as shown in the drawings, the right half of the outside of the hub 2 and the main part of the casing 1; and the corresponding series of dies will fashion what is now the left half of the outside of the hub 2 and of the main part of the casing 1 and will also fashion the hub 6 by their vertical motion. In this case the inside of the hub 6 may be roughly fashioned as well as the outside, leaving the inside to be machined for its completion. But in this case the passage 3, the passage 4, the chamber 8, the chamber 9 and the recess 10 have to be machined for their formation.

Second: Similarly the dies may be so constructed that one series of dies will fashion what is shown in Fig. 2 as the upper half of the outside of the hub 6 and of the main part of the casing 1 and will also fashion by their vertical motion the hub 2; and the corresponding series of dies will fashion the lower half of the outside of the hub 6 and of the main part of the casing 1, leaving their interiors to be machined.

Third: The dies may be so constructed that, placing the hot piece of steel in the position as shown in Fig. 1, one series of dies will fashion the lower half of the outside of the hubs 2 and 6 and of the adjacent part of the main part of the casing 1; and the corresponding series of dies will fashion the upper half of the outside of the hubs 2 and 6 and will also fashion the adjacent part of the main part of the casing. In this case the inside of the main part of the casing 1 may be roughly fashioned as well as the outside, leaving the chamber 9 to be threaded and the passage 4, chamber 8 and the recess 10 to be machined as smooth as desired. But in this case the passages 3 and 7 have to be machined for their formation. In any case the casing 1 when finished constitutes a strong and compact valve chamber.

Screwed within the chamber 9 is a valve 11, having a cylindrical lower end, extending within the chamber 8 and with an annular recess on its under side containing a ring 12 adapted for seating on and closing the seat 5; and having a stem 13 extending upward above the casing 1 and squared and threaded at its top. The valve 11 and its stem 13 may be turned down and threaded in the usual manner. A lead gasket 14 occupies the recess 10. A perforated flanged cap 15, in the shape of a hexagonal nut on top, threaded around its lower part and with an annular step between its hexagonal top and its threaded part, surrounds the stem 13 and is screwed downward within the chamber 9 until its step compresses the gasket 14 within the recess 10, so as to prevent any leakage between the two threaded adjacent surfaces and so that the lower end of the cap permits the valve 11 to be lifted as far as necessary to secure a free passage through the seat 5, but prevents an excessive lift of the valve. Around the axial center of the cap 15 for about the upper two-thirds of its height is a stuffing box recess 16, threaded for about the upper half of its length. The cap 15 may be partly drop forged or it may be entirely lathed from hexagonal stock. Within the recess 16 around the stem 13 is a packing 17 and above that around the stem is a packing ring 18. A hexagonal gland nut 19, surrounding the stem 13, is screwed within the recess 16 so as to bear down upon the ring 18 and to compress the packing 17 sufficiently to prevent any leakage along the stem. A hand wheel 20 is on the squared top of the stem 13 and is secured in place by a lock nut 21. It is evident that a little turning of the wheel 20 one way or the other opens or closes the valve.

Next considering Figs. 3 and 4: Here the parts that are identical with those of the preceding figures are indicated by the same numerals and require no description; and the parts that are similar are indicated by a corresponding numeral with the addition of an "a." The casing 1ª has at its lower end a vertical cylindrical hub 2ª with a vertical straight passage 3ª extending from the lower end of the hub, in axial alinement with the hub and the main part of the casing, to the inside of the rimmed valve seat 5. The process of drop forging this construction of valve is simpler than in case of the preceding construction, but is so similar as to require no further description.

In Figs. 1 and 2 the outside of the hub 2 is externally threaded for an exterior pipe connection and the inside of the hub 6 is internally threaded for an internal pipe connection. But this condition may be reversed; or both hubs may be either externally or internally threaded, as found convenient in view of the size of pipe to be connected. In fact such a reversal of the threading is shown in Figs. 3 and 4.

The valve of Figs. 3 and 4 is called a down elbow valve because its inlet passage 3ª is from beneath, as is common with the usual angle valve. The valve of Figs. 1 and 2 is called a left elbow valve because, with its inlet passage 3 in the position shown in Fig. 2, its outlet passage 7 is toward the left. A valve similar to this latter valve, but with its outlet passage toward the right, would be called a right elbow valve. In refrigeration installations the common straight-away valve is frequently placed near an elbow. But by using some one of my three elbow valves two unnecessary joints in the piping can be avoided.

The ordinary stop valve used for controlling the flow of ammonia has a cast iron casing. But, as is well known, cast iron is very apt to be so porous as to permit of the escape of tenuous gases. Furthermore, the defect of porosity in the valve usually does not appear until the parts have been machined, assembled and tested. The consequent percentage of worthless valves is quite considerable. But with my construction the possibility of a leaky valve wall does not exist. With the ordinary stop valve, furthermore, in the attempt to prevent leakage, the walls are made very thick and the entire valve is consequently large and clumsy in the smaller sizes. Finally, my valve is so constructed that the work of machining and threading is reduced to a minimum.

In the claims, for convenience of description, the upper part of the structure shown in Figs. 1 and 3 is referred to as the top of the valve in the same or equivalent language; and the lower part, as so shown, is referred to as the lower part of the valve in the same or equivalent language.

I claim:

1. In combination a valve casing having a valve seat, a passage below said seat, a lateral passage above said seat, a threaded opening above said seat continuously threaded and an annular recess at the top of the casing around the opening, a gasket in said recess, in said opening a threaded valve screwing up and down therein, coöperating with said seat and having a stem extending upward through the opening, a flanged cap surrounding said stem, screwed into said opening so as to compress said gasket by its flange and having in its upper part a stuffing box recess threaded at the top, packing in said stuffing box recess surrounding said stem, and means screwed into the top of said stuffing box recess so as to compress said packing.

2. In combination a valve casing having a valve seat, a passage below said seat, a lateral passage above said seat, a threaded opening above said seat continuously threaded and of uniform diameter between the tops of the threads and an annular recess at the top of the casing around the opening, a gasket in said recess, in said opening a threaded valve screwing up and down therein, coöperating with said seat and having a stem extending upward through the opening, a flanged cap surrounding said stem, screwed into said opening so as to compress said gasket by its flange and having in its upper part a stuffing box recess threaded at the top, packing in said stuffing box recess surrounding said stem, and means screwed into the top of said stuffing box recess so as to compress said packing.

3. In combination a valve casing having a valve seat, a passage below said seat, a cylindrical space above said seat, a lateral passage leading from said space, a threaded opening above said space continuously threaded and an annular recess at the top of the casing around the opening, a gasket in said recess, in said opening a threaded valve screwing up and down therein, coöperating with said seat and having a stem extending upward through the opening, a flanged cap surrounding said stem, screwed into said opening so as to compress said gasket by its flange and having in its upper part a stuffing box recess threaded at the top, packing in said stuffing box recess surrounding said stem, and means screwed into the top of said stuffing box recess so as to compress said packing.

4. In combination a valve casing having a valve seat, a passage below said seat, a cylindrical space above said seat, a lateral passage leading from said space, a threaded opening above said space continuously threaded and of uniform diameter between the tops of the threads and an annular recess at the top of the casing around the opening, a gasket in said recess, in said opening a threaded valve screwing up and down therein, coöperating with said seat and having a stem extending upward through the opening, a flanged cap surrounding said stem, screwed into said opening so as to compress said gasket by its flange and having in its upper part a stuffing box recess threaded at the top, packing in said stuffing box recess surrounding said stem, and means screwed into the top of said stuffing box recess so as to compress said packing.

FRANK N. ROEHRICH.

Witnesses:
   JESSE H. SWIEDLER,
   DAVID BARSHELL.

Copies of this patent may be obtained for five cents each, by addressing the "Commissioner of Patents, Washington, D. C."